United States Patent [19]

Boria

[11] 4,392,326
[45] Jul. 12, 1983

[54] PLANT SHELTER

[76] Inventor: Thomas J. Boria, 34 Howe St., Millbury, Mass. 01527

[21] Appl. No.: 277,102

[22] Filed: Jun. 25, 1981

[51] Int. Cl.³ .............................................. A01G 13/00
[52] U.S. Cl. .................................................... 47/28 R
[58] Field of Search ............................... 47/19, 26–32, 47/20–25

[56] References Cited

U.S. PATENT DOCUMENTS

| | | | |
|---|---|---|---|
| 74,879 | 2/1868 | Bartlett | 47/28 |
| 94,169 | 8/1869 | Jillson | 47/19 |
| 1,611,759 | 12/1926 | McWhirter . | |
| 1,848,345 | 3/1932 | Gregg . | |
| 2,626,483 | 1/1953 | Service | 47/29 X |
| 2,725,675 | 12/1955 | Odle . | |
| 2,835,078 | 5/1958 | Whitmore | 47/26 X |
| 2,950,567 | 8/1960 | Newman | 47/27 X |
| 3,093,930 | 6/1963 | Witkowski . | |
| 3,226,881 | 1/1966 | Garrett . | |
| 3,315,409 | 4/1967 | Poulin . | |
| 3,704,545 | 12/1972 | Van Reisen . | |
| 4,160,340 | 7/1979 | Levett | 47/28 |

FOREIGN PATENT DOCUMENTS

| | | | |
|---|---|---|---|
| 842380 | 6/1939 | France | 47/28 |
| 1032371 | 7/1953 | France | 47/26 |

Primary Examiner—James R. Feyrer
Attorney, Agent, or Firm—Blodgett & Blodgett

[57] ABSTRACT

Apparatus for agricultural use, consisting of two dome-like, relatively-movable parts formed of plastic, the movement allowing apertures to be selectively closed or opened for admission of rain or the like.

13 Claims, 11 Drawing Figures

PLANT SHELTER

BACKGROUND OF THE INVENTION

In the propagation of vegetable and floral plants, it is common practice to provide the plants with a protective shelter called a "hot cap". This device has one function of allowing the plant to be kept warm, even though the temperature drops close to the freezing mark. It also serves to protect the plant against destruction (particularly while it is in the young, tender stage) by heavy rains, hail, wind and the like. Hot caps are normally formed from an inexpensive material such as papier-mache. Such material tends to soften and destruct under the action of rain. In addition, because it is so light in weight, there is a tendency for the wind to blow the cap away and expose the plant to the elements. Because of these factors, the hot caps normally are considered as having a useful life of only one growing season, so that it is necessary to buy a new supply of caps every year. Furthermore, such devices do not admit rain or sunshine when necessary nor do they allow access to the plant by bees at a time when the bee activity is necessary for pollination. These and other difficulties experienced with the prior art devices have been obviated in a novel manner by the present invention.

It is, therefore, an outstanding object of the invention to provide a plant shelter in which a simple adjustment permits access to rain, to wind, or to bee activity.

Another object of this invention is the provision of a plant shelter which is not subject to destruction by rain or wind.

A further object of the present invention is the provision of a plant shelter which has a simple but effective anchoring function.

It is another object of the instant invention to provide a plant shelter which has a built-in capacity for passing ultra-violet light to the plant as well as to absorb thermal energy.

With these and other objects in view, as will be apparent to those skilled in the art, the invention resides in the combination of parts set forth in the specification and covered by the claims appended hereto.

SUMMARY OF THE INVENTION

In general, the invention consists of a plant shelter with a dome-like lower shell having a plurality of apertures. An upper shell is provided that conforms generally to a portion of the surface of the lower shell and also has a plurality of apertures. The upper and lower shell are held together for relative sliding movement from a first position in which the apertures are co-extensive to a second position where the apertures are non-co-extensive.

More specifically, the shells are provided with small apertures in their upper portion for the admission of rain and large apertures along their sides for the admission of air and bees. The upper portions of the shells are formed of clear plastic, while the lower portions are colored a dark color.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
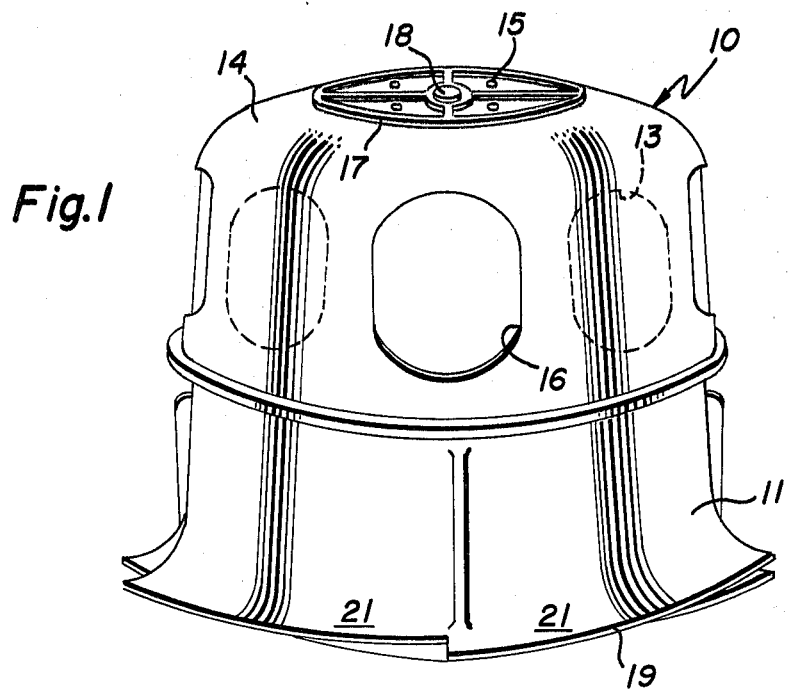
FIG. 1 is a perspective view of a plant shelter incorporating the principles of the present invention.

Referring first to FIG. 1, wherein are best shown the general features of the invention, the plant shelter, indicated generally by the reference numeral 10, is shown as having a dome-like lower shell 11 having a plurality of apertures 13. An upper shell 14 conforms generally to the upper part of the surface of the lower shell 11 and also has a plurality of apertures 16. The upper shell 14 and the lower shell 11 are held together by a pivot pin 18 for relative sliding movement from a first position at which the apertures are co-extensive to a second position (shown in FIG. 1), at which the apertures are non-co-extensive.

Figure 3:
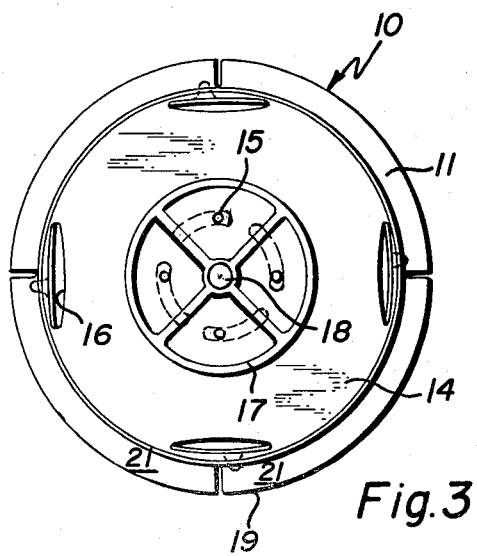
FIG. 3 is a top plan view of the plant shelter.
Figure 4:
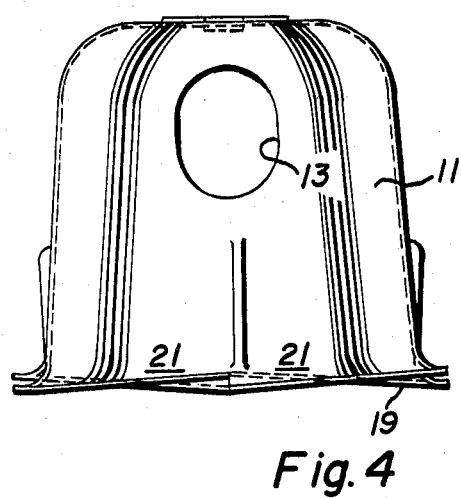
FIG. 4 is a front elevational view of a lower shell forming part of the plant shelter.
Figure 5:
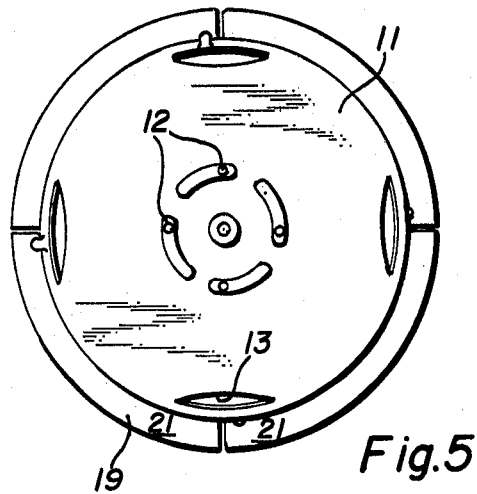
FIG. 5 is a top plan view of the lower shell.

Referring now to FIGS. 2-5, it can be seen that the upper shell 14 is generally hemispherical and is provided with a rain-collecting ridge 17 located on its upper portion in the form of a closed FIG. (see particularly FIG. 3). A plurality of small apertures 15 lie within the ridge enclosure. The upper and lower shells have matching, generally-vertical surfaces and the apertures 13 and 16 are large openings that allow air movement in and out when the shells are slid to the first position. The shells are in the form of inverted cups and the sliding movement takes place by rotation of one shell relative to the other about the vertical axis defined by the pivot pin 18. The lower shell 11 has a skirt that extends below the upper shell by a substantial amount. The rain-collecting ridge 17 is circular and is concentric with the axis of the pivot pin 18. The apertures 15 in the upper shell 14 and similar small apertures 12 formed in the lower shell 11 lie in an imaginary circle concentric with the ridge. The lower shell 11 is formed with a lower edge 19 having helical portions 21 permitting it to be locked in place in the earth by rotation of the entire assembly.

The bottom part of the lower shell 11 is colored black to absorb heat and the upper portion of the lower shell, as well as the entire upper shell 14, are formed of clear plastic to admit sunlight.

Figure 6:
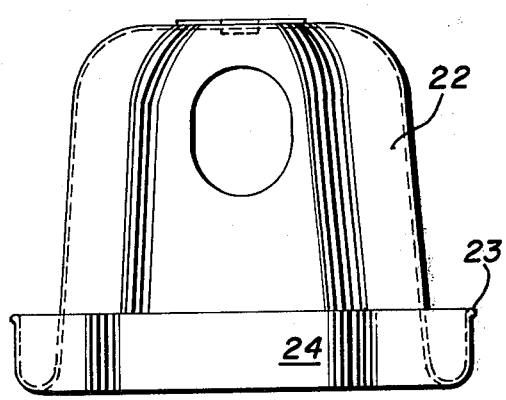
FIG. 6 is a front elevational view of a lower shell of a modified form of the plant shelter.
Figure 7:
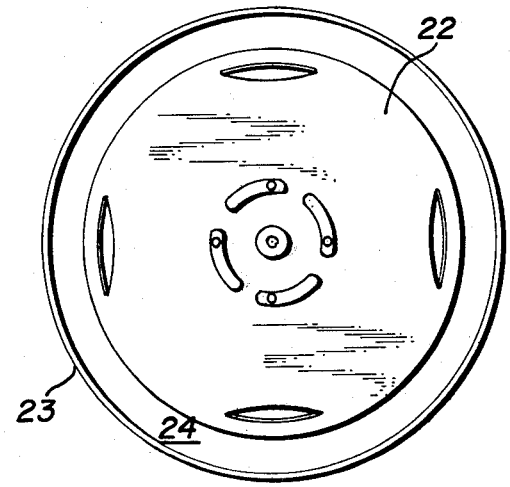
FIG. 7 is a top plan view of the lower shell shown in FIG. 6.

FIGS. 6 and 7 show a lower shell 22 which is similar in most respects to the lower shell 11 described above. In one respect, however, it is different; the lower edge is formed with an upwardly-directed lip 23 forming a trough 24 that is capable of receiving and retaining water. This water not only stabilizes the entire structure, but also assists in storing heat and heating the plant and the earth around it.

Figure 8:
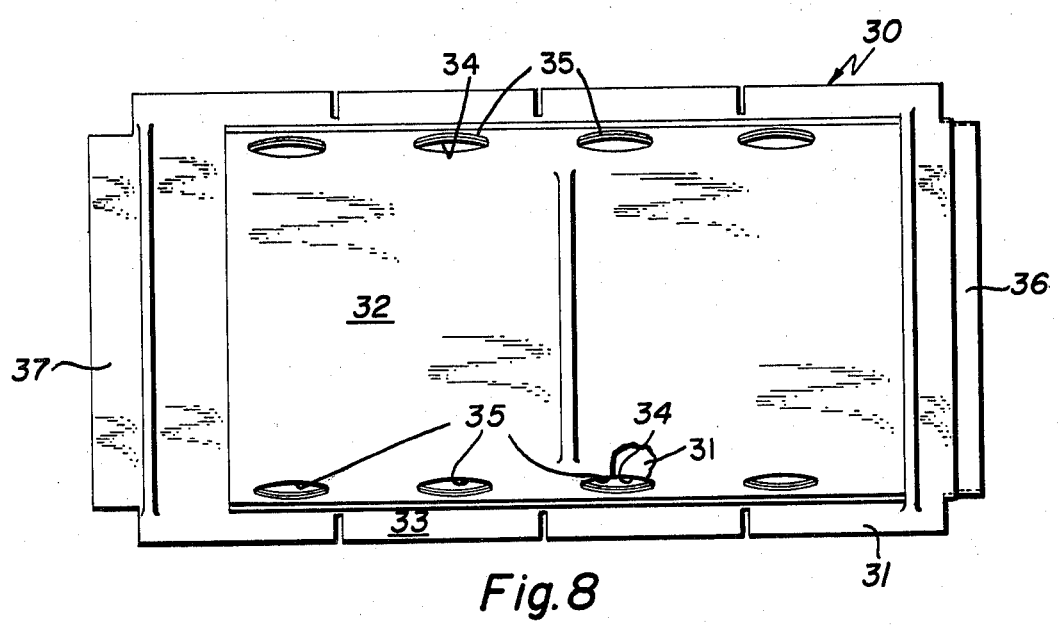
FIG. 8 is a top plan view of a modified form of the plant shelter.
Figure 9:
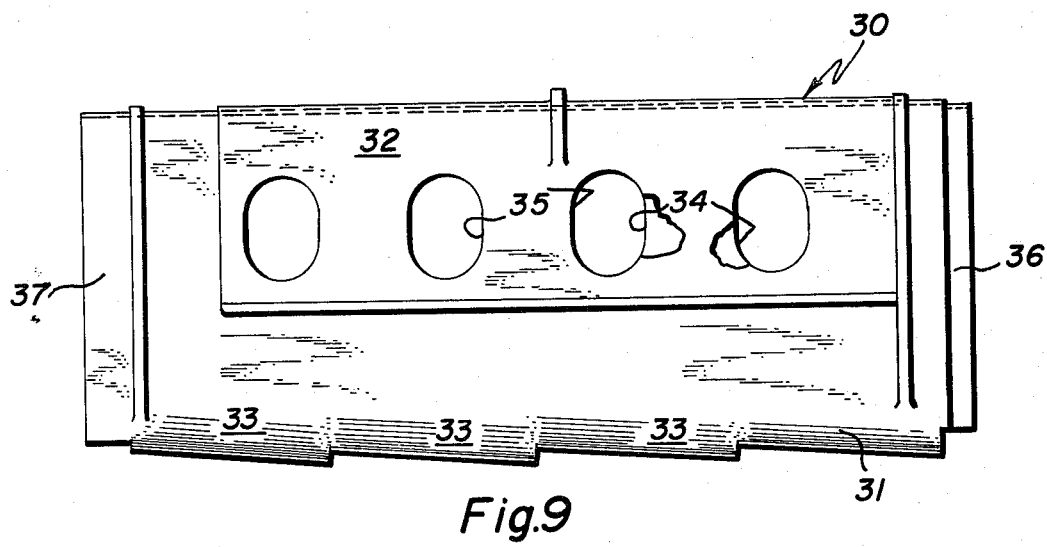
FIG. 9 is a front elevational view of the plant shelter shown in FIG. 9.
Figure 10:
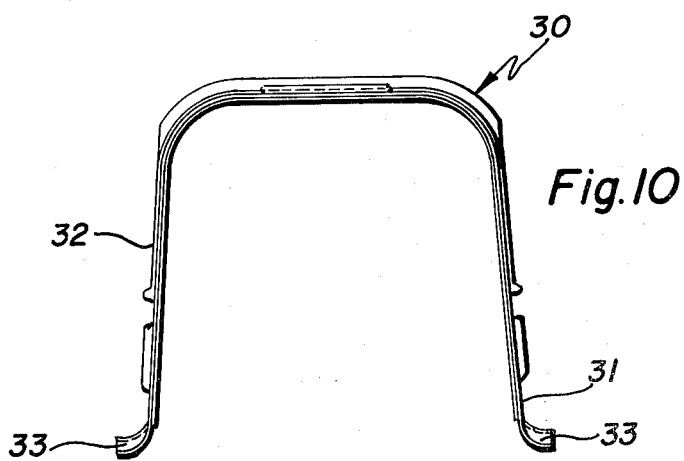
FIG. 10 is a side elevational view of the plant shelter shown in FIG. 8.

Referring to FIGS. 8, 9, and 10, it can be seen that the modified form of the plant shelter, indicated generally by the reference numeral 30, consists of a lower shell 31 and an upper shell 32 both in the general form of an inverted trough. The sliding takes place in a straight line and in a generally-horizontal direction. The lower shell 31 has generally straight line lower edges located in spaced parallel relationship, each edge being formed with inclined portions 33 to permit locking with the earth. The lower shelf 31 is provided in its downwardly-directed surfaces with a plurality of a large apertures 34 and the upper shell 32 also is provided with the large apertures 35. The two shells are shown in such a position that the apertures 34 and 35 are co-extensive and, therefore, provided an opening into the interior.

The upper shell 32 is substantially shorter than the lower shell 31 to admit relatively sliding movement of the upper shell from the first position at one end, as shown in the drawings, to a second position toward the other end; nevertheless, in either position it does not extend beyond the end of the lower shell. The ends of the lower shell are provided with extensions 36 and 37 to permit the assembly to be joined with the corresponding ends of the lower shell of another plant shelter.

Figure 2A:
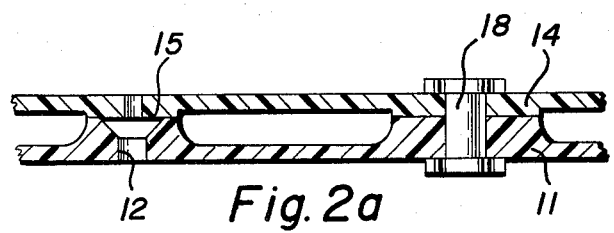
FIG. 2a is a sectional view of the plant shelter taken on the line II—II of FIG. 2.
Figure 2:
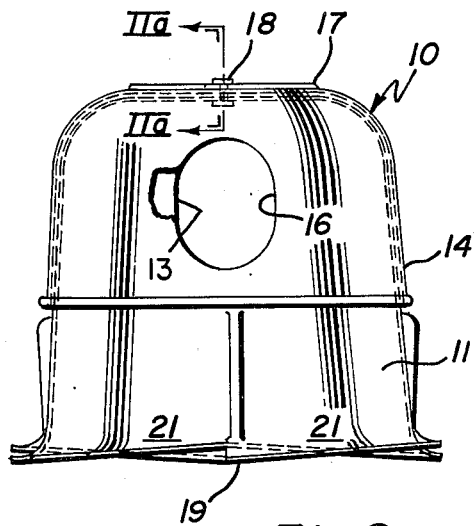
FIG. 2 is a front elevational view of the plant shelter.

The operation and advantages of the invention will not be readily understood in view of the above description. The plant shelter 10 is placed over a growing plant by depositing the lower edge 19 of the lower shell 11 on the earth with the plant enclosed within. The entire assembly is rotated, and the helical portions 21 screw down into the earth to hold the shelter in place. At that time the plant is fully protected from wind and rain. When the upper shell 14 is rotated to the first position relative to the lower shell 11, as is shown in FIG. 1, the apertures 13 and 16 are non-co-extensive and no air can enter the area within which the plant lies. At that time also, the apertures 15 of the upper shell 14 and the apertures 12 of the lower shell are not aligned. Therefore, rain can accumulate within the enclosure formed by the ridge 17. If the upper shell 14 is rotated relative to the lower shell 11 so that the apertures match, as shown in FIG. 2a, the rain will run down into the enclosure and water the plant. Also, at certain times of the year it is necessary to give access to the plant for the entry of bees for purposes of pollination. To do this, the upper shell 14 is rotated relative to the lower shell 11, so that the aperture 16 overlies the aperture 13 and not only can bees enter, but also light, wind, and rain. The fact that the upper portions of the shells are formed of clear plastic allows ultra-violet light to shine into the plant, as is necessary to promote growth. On the other hand, rendering the lower skirt or portion of the lower shell 11, a black color will allow it to absorb heat more readily and transmit it into the earth surrounding the plant, as well as to re-radiate through the air to the plant. The fact that the helical portions 21 extend down into the earth assures that the plant shelter will not be moved by the wind or blown away. Similarly, in the version of the plant shelter shown in FIGS. 6 and 7, the weight of water carried in the trough 24 performs the same function and additionally stores heat. In the case of the modification of the invention shown in FIG. 8, the inclined portions 33 are inserted into the earth in the same manner and serve to prevent the wind from blowing the shelter away.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Plant shelter, comprising:
   (a) a dome-like lower shell having a generally vertical transparent wall with primary apertures which are sufficiently large to allow passage of bees, and
   (b) an upper shell conforming generally to the upper portion of the lower shell and having a generally vertical transparent wall which overlaps at least the upper half of the vertical wall of the lower shell and has primary apertures which are sufficiently large to allow passage of bees, the upper and lower shells being held together for relative sliding movement from a first position at which the apertures of the upper shell are coextensive with the apertures of the lower shell to allow air and bee movement in and out of the shelter to a second position at which the apertures of the upper shell are non-coextensive with the apertures of the lower shell, the upper shell being provided with a rain-collecting ridge in its upper portion in the form of a closed figure, said upper shell having secondary apertures lying within the figure, and the lower shell having similar secondary apertures for cooperation with the secondary apertures in the upper shell to drain rain water from within the ridge to the interior of the lower shell.

2. Plant shelter as recited in claim 1, wherein the shells are in the form of inverted cups and the sliding movement takes place by rotation of one shell relative to the other about a vertical axis, the lower shell extending below the upper shell by a substantial amount, wherein the rain-collecting ridge is circular and is concentric with the said vertical axis, and wherein the secondary apertures lie on an imaginary circle concentric with the ridge.

3. Plant shelter as recited in claim 1, wherein the lower shell is formed with a lower edge having helical portions permitting it to be locked in place in the earth by rotation.

4. Plant shelter as recited in claim 1, wherein the lower shell is formed with a lower edge having an upwardly-directed lip defining a trough capable of receiving and storing water to stabilize the structure and promote hydrothermal heating.

5. Plant shelter as recited in claim 1, wherein the lower portion of the lower shell is colored black to absorb heat and the upper portion and the upper shell are clear to admit sunlight.

6. Plant shelter as recited in claim 1, wherein the upper surface of the lower shell is provided with a plurality of upwardly-extending bosses to support the upper shell for sliding movement, the bosses being formed with the small apertures adapted to be aligned with the small apertures in the upper shell.

7. Plant shelter as recited in claim 1, wherein the upper and lower shells are in the general form of inverted troughs, wherein sliding takes place in a straight line, generally horizontal direction, and wherein the lower shell has generally straight-line lower edges in spaced, parallel relationship, each being formed with inclined portions that permit locking with the earth.

8. Plant shelter as recited in claim 7, wherein the upper shell is substantially shorter than the lower shell to permit relative sliding movement of the upper shell from the first position to the second position without extending beyond the ends of the lower shell.

9. Plant shelter as recited in claim 8, wherein the ends of the lower shell are formed with extensions permitting joining with corresponding ends of the lower shelf of another plant shelter.

10. Plant shelter, comprising:
(a) a dome-like lower shell having the general form of an inverted trough and having a generally vertical transparent wall with primary apertures which are sufficiently large to allow passage of bees, said lower shell having generally straight-line lower edges in spaced, parallel relationship, each of said lower edges being formed with inclined portions that permit locking with the earth, said lower shell having secondary apertures in its upper surface, and
(b) an upper shell having a general form of an inverted trough and conforming generally to a portion of the lower shell and having a generally vertical transparent wall with primary apertures which are sufficiently large to allow passage of bees, the upper and lower shells being held together for relative straight line, generally horizontal sliding movement from a first position at which the primary apertures of the upper shell are coextensive with the primary apertures of the lower shell to allow air and bee movement in and out of the shelter to a second position at which the primary apertures of the upper shell are non-coextensive with the primary apertures of the lower shell, the upper shell being provided with a rain-collecting ridge in its upper portion in the form of a closed FIG., said upper shell having secondary apertures lying with the FIG. for cooperation with the secondary apertures in the lower shell to drain rain water from within the ridge to the interior of the lower shell.

11. Plant shelter as recited in claim 10, wherein the upper shell is substantially shorter than the lower shell to permit relative sliding movement of the upper shell from the first position to the second position without extending beyond the ends of the lower shell.

12. Plant shelter as recited in claim 11, wherein the ends of the lower shell are formed with extensions permitting joining with corresponding ends of the lower shell of another plant shelter.

13. Plant shelter, comprising:
(a) a dome-like lower shell having a generally vertical transparent wall with primary apertures which are sufficiently large to allow passage of bees, the upper surface of said lower shell being provided with upwardly extending bosses which are formed with secondary apertures, and
(b) an upper shell conforming generally to a portion of the lower shell and having a generally vertical transparent wall with relatively large apertures which are sufficiently large to allow passage of bees, the upper shell being supported on said bosses for relative sliding movement from a first position at which the primary apertures of the upper shell are coextensive with the primary apertures of the lower shell to allow air and bee movement in and out of the shelter to a second position at which the primary apertures of the upper shell are non-coextensive with the primary openings of the lower shell, the upper shell being provided with a rain-collecting ridge in its upper portion in the form of a closed figure, said upper shell having secondary apertures lying with the figure, and adapted to be aligned with the secondary apertures of the lower shell apertures for cooperation with the secondary apertures in the lower shell to drain rain water from within the ridge to the interior of the lower shell.

* * * * *

UNITED STATES PATENT AND TRADEMARK OFFICE
CERTIFICATE OF CORRECTION

PATENT NO. : 4,392,326
DATED : July 12, 1983
INVENTOR(S) : Thomas J. Boria

It is certified that error appears in the above-identified patent and that said Letters Patent is hereby corrected as shown below:

The term of this patent subsequent to June 12, 1997 has been disclaimed.

Signed and Sealed this

Third Day of June 1986

[SEAL]

Attest:

DONALD J. QUIGG

Attesting Officer  Commissioner of Patents and Trademarks